(12) United States Patent
O'Brien et al.

(10) Patent No.: US 8,187,702 B1
(45) Date of Patent: May 29, 2012

(54) DECORATIVE LAMINATE AND METHOD OF MAKING

(75) Inventors: Kevin Francis O'Brien, Cincinnati, OH (US); Frederic Auguste Taillan, Kings Mills, OH (US)

(73) Assignee: The Diller Corporation, Cincinnati, OH (US)

( * ) Notice: Subject to any disclaimer, the term of this patent is extended or adjusted under 35 U.S.C. 154(b) by 0 days.

(21) Appl. No.: 13/010,838

(22) Filed: Jan. 21, 2011

(51) Int. Cl.
*B32B 21/02* (2006.01)

(52) U.S. Cl. ............. 428/292.4; 428/297.4; 428/913.3; 428/46; 156/307.7

(58) Field of Classification Search .............. 428/46, 428/195.1, 297.4, 292.4, 913.3, 47; 156/307.7
See application file for complete search history.

(56) References Cited

U.S. PATENT DOCUMENTS

| | | | |
|---|---|---|---|
| 3,648,358 A * | 3/1972 | Cannady et al. ............. 29/527.4 |
| 3,663,353 A * | 5/1972 | Long et al. .................... 428/332 |
| 4,044,185 A * | 8/1977 | McCaskey et al. ........... 428/153 |
| 4,278,733 A * | 7/1981 | Benzinger .................... 428/413 |
| 4,552,781 A * | 11/1985 | Cannady et al. ............. 427/601 |
| 4,824,896 A | 4/1989 | Clarke et al. |
| 5,258,235 A | 11/1993 | Mehta et al. |
| 5,425,986 A * | 6/1995 | Guyette ........................ 428/141 |
| 5,466,571 A | 11/1995 | Mitsuhashi et al. |
| 5,643,666 A * | 7/1997 | Eckart et al. ................. 428/339 |
| 5,807,608 A * | 9/1998 | O'Dell et al. ................. 427/195 |
| RE36,742 E | 6/2000 | Correll et al. |
| 6,121,398 A * | 9/2000 | Wool et al. .................. 526/238.1 |
| 6,146,252 A | 11/2000 | Martensson |
| 6,432,488 B1 | 8/2002 | Daly et al. |
| 6,599,455 B2 | 7/2003 | Wierer et al. |
| 6,664,452 B1 | 12/2003 | Teel |
| 6,689,451 B1 * | 2/2004 | Peng et al. .................. 428/294.7 |
| 6,703,070 B1 | 3/2004 | Muthiah et al. |
| 6,929,841 B1 * | 8/2005 | Van Dijk et al. .............. 428/114 |
| 6,972,144 B2 | 12/2005 | Roth et al. |
| 7,026,013 B2 | 4/2006 | Deruelle et al. |
| 7,235,503 B2 | 6/2007 | Huusken et al. |
| 7,276,868 B2 | 10/2007 | Allred, III |
| 7,524,555 B2 * | 4/2009 | Peng et al. .................. 428/294.7 |
| 7,584,984 B1 * | 9/2009 | Williams, Jr. .............. 280/478.1 |
| 2002/0074095 A1 | 6/2002 | Wierer et al. |
| 2006/0032175 A1 * | 2/2006 | Chen et al. ....................... 52/578 |
| 2006/0157095 A1 | 7/2006 | Pham |
| 2006/0234027 A1 | 10/2006 | Huusken |
| 2007/0071989 A1 * | 3/2007 | Thiele ......................... 428/537.5 |
| 2007/0266673 A1 | 11/2007 | Springer |
| 2007/0298229 A1 | 12/2007 | Rasmusson et al. |
| 2008/0008885 A1 * | 1/2008 | Terfloth et al. .............. 428/411.1 |
| 2008/0098668 A1 | 5/2008 | Winterowd et al. |
| 2011/0159208 A1 * | 6/2011 | Price .............................. 427/557 |
| 2011/0263174 A1 * | 10/2011 | Ketzer et al. .................. 442/327 |
| 2011/0281117 A1 * | 11/2011 | Ortelt et al. ................... 428/418 |

FOREIGN PATENT DOCUMENTS

| | | |
|---|---|---|
| GB | 1 452 858 | 10/1976 |
| KR | 20040106271 | 12/2004 |
| WO | 2009139620 A2 | 5/2009 |

\* cited by examiner

*Primary Examiner* — N. Edwards

(74) *Attorney, Agent, or Firm* — Dinsmore & Shohl LLP

(57) ABSTRACT

A decorative laminate is provided and includes a core with at least one epoxy resin impregnated fiberboard sheet. The decorative laminate also includes at least one decorative layer provided adjacent to the core. A method of forming a decorative laminate is also provided.

23 Claims, 1 Drawing Sheet

DECORATIVE LAMINATE AND METHOD OF MAKING

BACKGROUND

Decorative laminates are commonly available for use on kitchen and bathroom surfaces. In general, these materials are formed from a supporting core and a polymeric resin. However, the rising cost of raw materials, particularly, the rising cost of resin-impregnated Kraft paper sheets, has added significantly to the expense of decorative laminate manufacture. Accordingly, there is still a need in the art for a decorative laminate core which imparts strength and resiliency to the laminate but does so with reduced materials costs.

SUMMARY

The present disclosure relates to decorative laminates and, more particularly, to decorative laminates including at least one epoxy impregnated fiberboard sheet. Although the epoxy impregnated fiberboard sheet described herein is useful in a variety of decorative laminate structures, for the purposes of illustration, the epoxy impregnated fiberboard sheets are illustrated herein with reference to specific decorative laminate configurations.

In accordance with one embodiment, a decorative laminate is provided. The decorative laminate includes a core comprising at least one epoxy resin impregnated fiberboard sheet. The decorative laminate also includes at least one decorative layer provided adjacent to the core.

In accordance with another embodiment, a decorative laminate is provided, which includes a core comprising at least one epoxy resin impregnated fiberboard sheet and at least one polymer impregnated Kraft paper sheet overlaying the at least one epoxy resin impregnated fiberboard sheet. The epoxy resin impregnated fiberboard sheet includes from about 15 wt. % to about 40 wt. % epoxy resin. The impregnated Kraft paper sheet is impregnated with epoxy resin, such that the epoxy resin makes up from about 1 wt. % to about 10 wt. % of the Kraft paper sheet. The decorative laminate also includes at least one decorative layer adjacent to the core.

In another embodiment, a method of making a decorative laminate is provided. The method includes providing at least one epoxy resin impregnated fiberboard sheet to form a core, and placing at least one decorative layer adjacent to the core. The method also includes applying heat and pressure to the coated decorative layer and core in an amount sufficient to cure and form a decorative laminate.

In another embodiment, the decorative laminate may include a core comprising at least one impregnated Kraft paper sheet. The at least one impregnated Kraft sheet is impregnated with epoxy resin, wherein the epoxy resin comprises from about 1 wt. % to about 10 wt. % of the at least one impregnated Kraft paper sheet. The decorative laminate may also include at least one decorative layer adjacent to the core. The decorative laminate comprises from about 60 wt. % to about 80 wt. % cellulosic material, from about 20 wt. % to about 30 wt. % phenolic formaldehyde, and from about 1 wt. % to about 10 wt. % epoxy resin.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
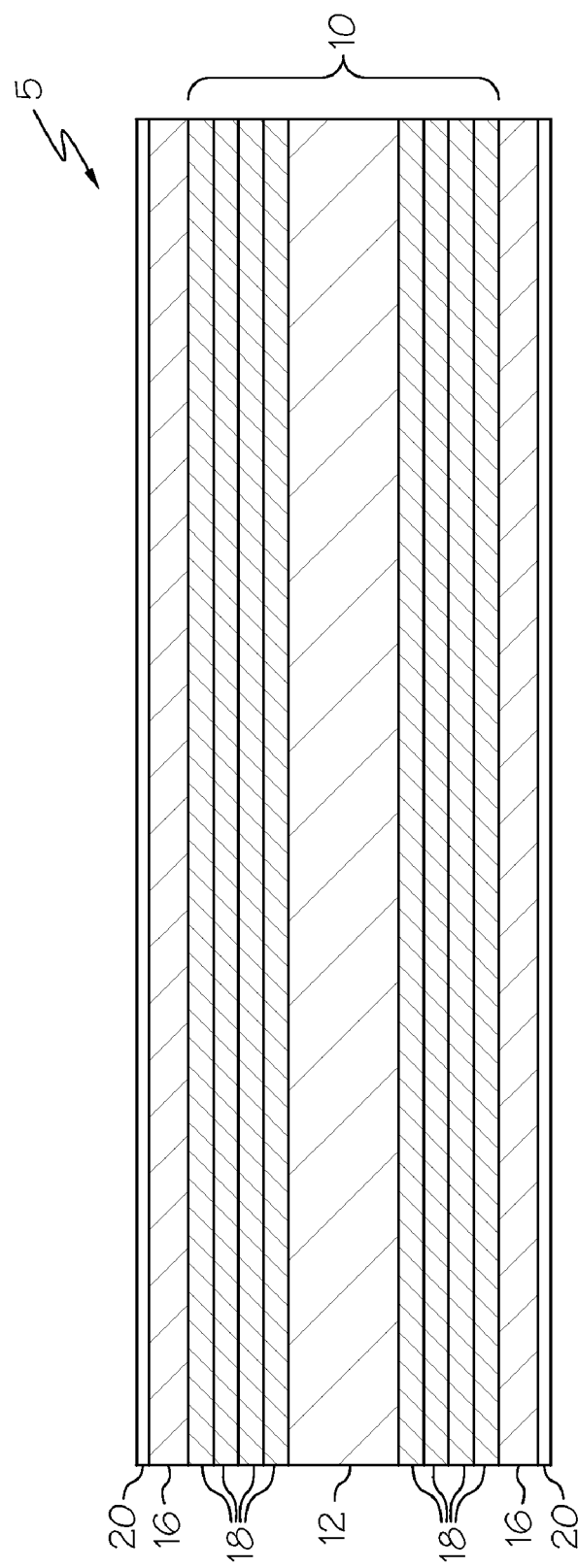
FIG. 1 illustrates a cross-sectional view of a decorative laminate in accordance with one or more embodiments.

The core of the decorative laminate is typically formed from a plurality of impregnated Kraft paper sheets, arranged in a layered configuration. Positioned above the core is a decorative layer which is typically a cellulose pigmented paper containing a print, pattern, or solid color. The decorative layer is generally covered with a transparent or semi-transparent protective overlay sheet (20) comprising a cellulose paper impregnated with a polymer resin such as melamine-formaldehyde. The overlay sheet (20) protects the decorative layer from abrasion, scratches, chemicals, burns, and the like.

As described above, both Kraft paper sheets and fiberboard sheets may be impregnated with an epoxy resin. The epoxy resin may be a heat curable, substantially transparent, liquid thermosetting epoxy resin. In one configuration, the epoxy resin comprises a clear, di-functional bisphenol A/epichlorohydrin-derived liquid epoxy resin. The epoxy resin may have an epoxide equivalent weight ranging from about 170 g/eq. to about 300 g/eq. Epoxide equivalent weight is used herein to mean the equivalent weight of a reactive polymer is the mass of polymer which has one equivalent of reactivity, such as one mole of reactive side chain groups. Other types of epoxy resins are also contemplated for use with the embodiments described herein, as will be appreciated by one of ordinary skill.

The epoxy resin may be modified by adding a reactive diluent or modifier to the mixture. The reactive diluent or modifier may function to reduce viscosity, improve pot life, lower exothermic characteristics, reduce shrinkage, and lower the cost of the epoxy resin component. Pot life is understood to mean the length of time in which a catalyzed thermosetting resin retains sufficiently low viscosity for processing. The reactive diluent or modifier may comprise cardura, butyl glycidyl ether, C-12-C14 aliphatic glycidyl ether, o-cresyl glycityl ether (CGE), and others as will be appreciated by one of ordinary skill The amount of reactive diluent or modifier may range from about 1 wt. % to about 20 wt. % of the epoxy resin.

In another configuration, a reactive cross-linking agent may be added to the modified or unmodified liquid epoxy resin. If added, the reactive cross-linking agent may be mixed in just before impregnation of the fiberboard, as it may substantially reduce the pot life of the epoxy resin. The reactive cross-linking agent may be chosen from the group including polyamides and/or poly amines associated with 2-methyl imidazole. In one example, a high molecular weight reactive polyamide with a high viscosity may be added to the epoxy resin. The reactive cross-linking agent may be based on a dimerized fatty acid and various polyamines. If added, the reactive polyamide component is included in an amount ranging from about 5 wt. % to about 15 wt. % of the epoxy resin. The cross-linking agent may react quickly, which results in a minimum cross-linking density to help resist gas vaporization and reduce the fiberboard compressibility during pressing.

A second curing agent, being more latent, may also be used with the modified epoxy resin. The second curing agent may comprise dicyanimide and/or polyamine. The amount of the second curing agent may range from about 1 wt. % to about 10 wt. % of the epoxy resin. In one example, a 2-methyl imidazole agent may be added. The second curing agent reacts primarily during the pressing step and further cross-links the resin in the compacted laminate structure.

A solvent may also be added to the modified epoxy resin liquid to adjust the viscosity of the liquid epoxy solution. The solvent may comprise a basic alcohol having at least two carbons, including, but not limited to, ethanol and propanol. Other epoxy solvents may also be used, as will be appreciated by one of ordinary skill.

The modified epoxy resin liquid may have a resin solid content ranging from about 40 wt. % to about 70 wt. %, or from about 55 wt. % to about 65 wt. %, based on the total weight of the modified epoxy resin liquid.

The decorative laminate 5 may also include other additives such as pigments, dyes, flame retardant agents, release agents, fluidizing agents, viscosity control agents, curing agents, antioxidants, toughening agents, and the like, as will be appreciated by one of ordinary skill For example, additional pigments having differing or contrasting colors may also be added to the composition. The inclusion of minor amounts of any or all of these additives is contemplated.

Commonly used pigments in these products are composed of small particles of inorganic compounds, often metallic oxides, which are roughly spherical in shape. Other pigments are also sometimes used, as well as fillers and larger pieces of colored material or "particulates" to provide different visual effects. Alumina trihydrate (ATH) is often included as a preferred filler to provide translucency and whiteness to the products, as well as for its excellent fire-retardant properties.

The decorative laminates 5 described above provide several advantages. The decorative laminate 5 has a lower density than conventional decorative laminates formed by other methods. In one configuration, the density of the decorative laminate 5 in accordance with one embodiment ranges from about 1.1 g/cm$^3$ to about 1.3 g/cm$^3$. In contrast, conventional methods of producing decorative laminates result in from between about 1.38 to about 1.50 g/cm$^3$. This results in a significant cost savings in materials. Furthermore, the use of one or more fiberboard sheets in the laminate results in significant cost savings as fiberboard sheets utilize substantially 100% of the tree, whereas Kraft paper sheets utilize only about 70% of the tree. Thus, the cost of fiberboard is lower than the cost of an equivalent weight of Kraft paper. Accordingly, the decorative laminates 5 described herein result in a materials cost saving from about 25% to 30% over previous laminated constructions. The decorative laminates 5 provided herein are less compressible, resulting in lower density. The decorative laminate 5 formed as described herein thereby results in significant reduction in material expenses, and has a lower density, while maintaining the strength and other properties of the decorative laminate.

For example, laminates fabricated using the materials and methods described herein have flexural strengths (ISO 178) in the range of from about 110 to about 130 MPa, flexural modulus (ISO 178) in the range of from about 9000 to about 10,000 MPa, and a dimensional stability (ISO 4586-1-11B) of 0.30 to 0.15% (cross direction) and 0.15 to 0.07% (machine direction). The laminates also exhibit an impact resistance (ISO 4856-1-13) wherein there is no effect with a drop height of 110<m, a stress crack resistance of Rating 5 (No effect) and a resistance to crazing (ISO 4586-1-21) having a Rating 4 (slight effect). These properties are comparable to conventional decorative laminates, but are achieved at a lower cost.

The decorative laminate 5 may be formed using a variety of methods and technologies, as will be appreciated by one of ordinary skill The decorative laminate 5 may be formed using a continuous process. However, it is contemplated that individual layers in the decorative laminate 5 may be produced at separate times (and even at separate locations) and stored prior to being formed into the final laminate. In one embodiment, the method of making a decorative laminate 5 comprises providing at least one epoxy resin impregnated fiberboard sheet 12, overlaying at least one resin impregnated Kraft paper sheet 18 on the at least one epoxy impregnated fiberboard sheet 12 to form a core 10, placing at least one decorative layer 16 on the core 10, and applying heat and pressure to the decorative layer 16 and core 10 in an amount sufficient to cure the polymer resins.

A large variety of direct release press plate designs can be advantageously used to practice embodiments of the present invention. Such designs can range from a very smooth, highly polished finish, to a deeply textured finish, in a wide range of gloss levels. Conversely, non-stainless steel press plates, for example tempered, and optionally anodized, aluminum alloy plates, or texturing plates or cauls comprised of laminated phenolic resin/Kraft paper filler, may also be used. Practice of the present methods is not restricted or limited by use of direct release press plates, in that press plates can also be used in conjunction with a variety of texturing/release papers, for example those commercially available from Ivex Corporation, S.D. Warren Co. (SAPPI), and Wurttemb Kunststoff Plattenwerke GmbH (WKP), or paper-backed aluminum foils such as a Kraft-backed Caulstock #6 or litho-backed Caulstock #13.

In one embodiment, the method may also include the use of a hydraulic high pressure laminating press. The press is typically comprised of multiple, horizontal heating/cooling platens positioned between an essentially rigid upper bolster and lower table, all of which are positioned within multiple, vertical "window frames," which contain the hydraulic force applied by multiple "rams." The rams are a symmetric array of cylinders and upstroke pistons mounted on the lower horizontal frame members under the press table. The platens, bored with serpentine channels, are piped to a suitable heating source, such as a steam boiler or high pressure hot water accumulator, as well as to a cooling water source, such as a cooling tower. Rams are piped to low pressure/high flow centrifugal pumps to quickly close the press, as well as high pressure/low flow piston pumps to generate and maintain the desired hydraulic system operating pressure. Both the heating/cooling and hydraulic systems have associated control systems to operate the press during a predetermined "press cycle," typically involving sequentially press close/commence heating, isothermal cure, commence cooling and press open segments.

It should be understood by those skilled in the art that the press cycle used in this example, and the related useful ranges of press time, temperature and pressure cited, as they affect the optimum cure level (and density) of the laminate so produced, is dependent on many factors, including, but not limited to the surface and core resin catalyst type and concentration, which affect their cure rates, resin catalytic or inhibitative effects of different overlay, decorative and core papers, as well as the thickness of the laminates and quantity of laminates per pack pressed. In general, the greater the pack thickness, due to more or thicker sheets, the longer the press cycle required, and the greater the resultant outside sheet and inside sheet cure variation. Even with the press pack build-up set forth in this example, higher cure temperatures and longer cure times than those prescribed may result in laminate overcure, which may adversely affect stress crack resistance and postformability. Conversely, lower cure temperatures and shorter cure times may detract from other laminate properties such as boiling water, heat, and blister resistance.

For the purposes of describing and defining the subject matter herein, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

For the purposes of describing and defining the subject matter herein it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A decorative laminate comprising:
   a core comprising at least one epoxy resin impregnated fiberboard sheet, wherein the epoxy resin impregnated fiberboard sheet comprises a sheet of fiberboard impregnated with epoxy resin; and
   at least one decorative layer provided adjacent to the core, wherein the decorative laminate defines a flexural strength in the range of from about 110 to about 130 MPa under ISO 178.

2. The decorative laminate of claim 1, wherein the thickness of the at least one epoxy resin impregnated fiberboard sheet ranges from about 2 mm to about 10 mm.

3. The decorative laminate of claim 1, wherein the thickness of the at least one epoxy resin impregnated fiberboard sheet ranges from about 4 mm to about 8 mm.

4. The decorative laminate of claim 1, wherein the at least one epoxy resin impregnated fiberboard sheet comprises from about 15 wt. % to about 40 wt. % epoxy resin.

5. The decorative laminate of claim 1, wherein the at least one epoxy resin impregnated fiberboard sheet comprises from about 25 wt. % to about 35 wt. % epoxy resin.

6. The decorative laminate of claim 1, further comprising an overlay sheet adjacent to the decorative layer.

7. The decorative laminate of claim 1, wherein the core further comprises at least one impregnated Kraft paper sheet overlaying the at least one epoxy resin impregnated fiberboard sheet.

8. The decorative laminate of claim 7, wherein the at least one impregnated Kraft paper sheet is selected from the group consisting of pigmented bleached Kraft paper, unpigmented bleached Kraft paper, pigmented α-cellulose paper, unpigmented α-cellulose paper, and combinations thereof.

9. The decorative laminate of claim 7, wherein the at least one impregnated Kraft paper sheet is impregnated with epoxy resin, wherein the epoxy resin comprises from about 1 wt. % to about 10 wt. % of the Kraft paper sheet.

10. The decorative laminate of claim 7, wherein at least one impregnated Kraft paper sheet is impregnated with a combination of epoxy resin and phenolic formaldehyde, wherein the epoxy resin comprises from about 1 wt. % to about 10 wt. % of the impregnated Kraft paper sheet and the phenolic formaldehyde comprises from about 20 wt. % to about 30 wt. % of the impregnated Kraft paper sheet.

11. The decorative laminate of claim 1, wherein the at least one epoxy impregnated fiberboard sheet is covered by at least one impregnated Kraft paper sheet on each major surface of the epoxy resin impregnated fiberboard sheet.

12. The decorative laminate of claim 1, wherein the density of the core of the decorative laminate ranges from about 1.15 g/cm$^3$ to about 1.35 g/cm$^3$.

13. The decorative laminate of claim 1, wherein the density of the core of the decorative laminate ranges from about 1.20 g/cm$^3$ to about 1.30 g/cm$^3$.

14. A method of making the decorative laminate of claim 1 comprising:
   providing the core;
   placing the at least one decorative layer adjacent to the core; and
      applying heat and pressure to the decorative layer and core in an amount sufficient to cure and form a decorative laminate, wherein the density of the core of the decorative laminate ranges from about 1.15 g/cm$^3$ to about 1.35 g/cm$^3$.

15. The method of claim 14, further comprising overlaying the at least one impregnated Kraft paper sheet on the at least one epoxy resin impregnated fiberboard sheet to form the core.

16. The method of claim 15, wherein the at least one impregnated Kraft paper sheet is impregnated with epoxy resin, wherein the epoxy resin comprises from about 1 wt. % to about 10 wt. % of the Kraft paper sheet.

17. The decorative laminate of claim 1, wherein the decorative laminate comprises from about 60 wt. % to about 80 wt. % cellulosic material.

18. The decorative laminate of claim 1, wherein the decorative laminate defines a flexural modulus in the range of from about 9000 to about 10,000 MPa under ISO 178.

19. The decorative laminate of claim 1, wherein the decorative laminate defines a dimensional stability in the cross-direction of 0.30 to 0.15% and a dimensional stability of 0.15 to 0.07% in the machine direction under ISO 4586-1-11B.

20. A decorative laminate comprising:
   a core comprising at least one epoxy resin impregnated fiberboard sheet, wherein the epoxy resin impregnated fiberboard sheet comprises a sheet of fiberboard impregnated with epoxy resin; and
   at least one decorative layer provided adjacent to the core, wherein the decorative laminate defines a flexural modulus in the range of from about 9000 to about 10,000 MPa under ISO 178.

21. The decorative laminate of claim 20, wherein the core further comprises at least one impregnated Kraft paper sheet overlaying the at least one epoxy resin impregnated fiberboard sheet.

22. A decorative laminate comprising:

a core comprising at least one epoxy resin impregnated fiberboard sheet, wherein the epoxy resin impregnated fiberboard sheet comprises a sheet of fiberboard impregnated with epoxy resin; and at least one decorative layer provided adjacent to the core, wherein the decorative laminate defines a dimensional stability in the cross-direction of 0.30 to 0.15% and a dimensional stability of 0.15 to 0.07% in the machine direction under ISO 4586-1-11B.

23. The decorative laminate of claim 22, wherein the core further comprises at least one impregnated Kraft paper sheet overlaying the at least one epoxy resin impregnated fiberboard sheet.

* * * * *